United States Patent [19]

Ignagni

[11] Patent Number: 5,617,317
[45] Date of Patent: Apr. 1, 1997

[54] TRUE NORTH HEADING ESTIMATOR UTILIZING GPS OUTPUT INFORMATION AND INERTIAL SENSOR SYSTEM OUTPUT INFORMATION

[75] Inventor: Mario B. Ignagni, Arden Hills, Minn.

[73] Assignee: Honeywell Inc., Minneapolis, Minn.

[21] Appl. No.: 378,114

[22] Filed: Jan. 24, 1995

[51] Int. Cl.⁶ ............................................... G01S 5/02
[52] U.S. Cl. ...................... 364/449.9; 364/453; 342/357
[58] Field of Search ................................ 364/443, 449, 364/453, 454, 459, 434; 342/352, 357, 358, 457

[56] References Cited

U.S. PATENT DOCUMENTS

| | | | |
|---|---|---|---|
| 4,402,049 | 8/1983 | Gray | 364/453 |
| 4,881,080 | 11/1989 | Jablonski | 342/357 |
| 4,930,085 | 5/1990 | Kleinschmidt | 364/449 |
| 5,021,792 | 6/1991 | Hwang | 342/357 |
| 5,101,356 | 3/1992 | Timothy et al. | 364/449 |
| 5,119,101 | 6/1992 | Barnard | 342/357 |
| 5,148,179 | 9/1992 | Allison | 342/357 |
| 5,177,489 | 1/1993 | Hatch | 342/357 |
| 5,193,064 | 3/1993 | Maki | 364/454 |
| 5,216,611 | 6/1993 | McElreath | 364/454 |
| 5,233,524 | 8/1993 | Jackson | 364/424.01 |
| 5,317,515 | 5/1994 | Matsuzaki | 364/454 |
| 5,339,246 | 8/1994 | Kao | 342/357 |
| 5,345,382 | 9/1994 | Kao | 364/457 |
| 5,349,530 | 9/1994 | Odagawa | 342/357 |
| 5,349,531 | 9/1994 | Sato et al. | 364/449 |
| 5,359,521 | 10/1994 | Kyrtsos et al. | 364/449 |
| 5,379,045 | 1/1995 | Gilbert et al. | 342/357 |
| 5,382,957 | 1/1995 | Blume | 342/357 |
| 5,406,489 | 4/1995 | Timothy et al. | 364/434 |
| 5,430,654 | 7/1995 | Kyrtsos et al. | 342/357 |

*Primary Examiner*—Gary Chin
*Attorney, Agent, or Firm*—Robert A. Pajak; Charles J. Ungemach

[57] ABSTRACT

Inertial sensor information is combined with GPS information derived from satellite information signals separately received by a pair of GPS antennae and separately processed. This information is processed in a manner to arrive at the offset angle between the inertial sensor heading angle and true north.

12 Claims, 4 Drawing Sheets

TRUE NORTH HEADING ESTIMATOR UTILIZING GPS OUTPUT INFORMATION AND INERTIAL SENSOR SYSTEM OUTPUT INFORMATION

BACKGROUND OF THE INVENTION

1. Field of the Invention

The present invention relates to a system for determining true north heading information. More particularly, the present invention is directed to a system which employs an inertial sensor system and a satellite positioning system for relating the inertial sensor system reference frame to a geographic reference frame.

2. Description of the Related Art

Global positioning systems incorporating the use of satellites are well-known in the art and are sometimes referred to as "satellite positioning systems". Such systems, for example, NAVSTAR-GPS (or simply GPS), are accurately being used for the determination of the geocentric position of mobile units, for example, among others, land vehicles, aircraft and survey equipment. Satellite positioning systems, herein referred to as "GPS systems", are now being employed for aircraft navigation and flight control, and airspace control. These GPS systems may operate independently or in combination with inertial sensor systems for providing aircraft attitude information during an aircraft flight mission.

As is well-known, the federal aeronautical administration requires aircraft to employ some system for determining true north heading, i.e., the heading of the aircraft relative to "true north". One such system employs the use of an AHRS (Attitude Heading Reference System) system in combination with a magnetic flux valve from which magnetic north is determined and true north is derived from magnetic deviation tables. Although an AHRS system commonly employs sufficient sensors—namely, three gyros and three accelerometers—to provide aircraft attitude information, the gyros may not have sufficient accuracy to provide accurate heading information. Generally speaking, an AHRS system is a "low performance grade" inertial navigational system which is sufficient to provide accurate pitch and roll information, but is insufficient, by itself, to provide a reliable indication of true north heading. To overcome deficiencies of the AHRS system alone, magnetic flux valve readings are blended in a filter with the AHRS attitude information so as to provide a more accurate magnetic north heading angle. In turn, this later angle may be corrected by use of the magnetic deviation look-up table for a precise determination of the true north heading angle of the aircraft.

In contrast, use of GPS position and velocity information alone may be used for purposes of determining true north heading. Although, the GPS information may be reliable for a static condition—either a non-moving mobile unit or a very slowing moving unit, it is insufficient, by itself, to provide accurate heading information for an aircraft whose mobile position is rapidly and dynamically changing.

SUMMARY OF THE INVENTION

An object of the present invention is to provide accurate true north heading information employing a GPS-aided inertial sensor system.

In the present invention, a pair of antennae are rigidly fixed to a mobile unit and have known positions relative to a mobile unit coordinate reference frame. The antennae are configured for receiving satellite information signals transmitted from selected satellites, which form, in part a satellite-based global positioning system. In turn, a conventional satellite positioning system receiver coupled to each antenna of the pair of antennae provides (i) output information signals representative of the earth-centered coordinate position of the mobile unit, (ii) the earth-centered coordinate positions of the selected satellites derived from the satellite information signals, and (iii) satellite-specific relative range difference values where a relative range difference value is the difference between (a) one antenna and a specific satellite and (b) the other antenna of the pair of antennae and the same specific satellite. The mobile unit is further provided with an inertial sensor system rigidly fixed to the mobile unit for providing accurate mobile unit attitude information from which the mobile unit's pitch angle, roll angle, and heading angle may be determined. In turn, a signal processing apparatus operates on (i) the positions of the satellites, (ii) the position of the mobile unit, (iii) the satellite-specific relative range difference values, and (iv) the inertial sensor attitude information for determining a heading offset angle, where the heading offset angle is the difference between the mobile unit's heading angle relative to the AHRS computational reference frame and substantially the true north heading angle of the mobile unit.

In the present invention, the satellite-specific relative range difference information may be obtained by separately processing a satellite-specific satellite information signal received by both antennae and utilizing, alone or in combination, GPS receiver pseudo range data, pseudo range rate data, carrier phase data, and/or Doppler shift data.

DETAILED DESCRIPTION OF THE INVENTION

Figure 1:
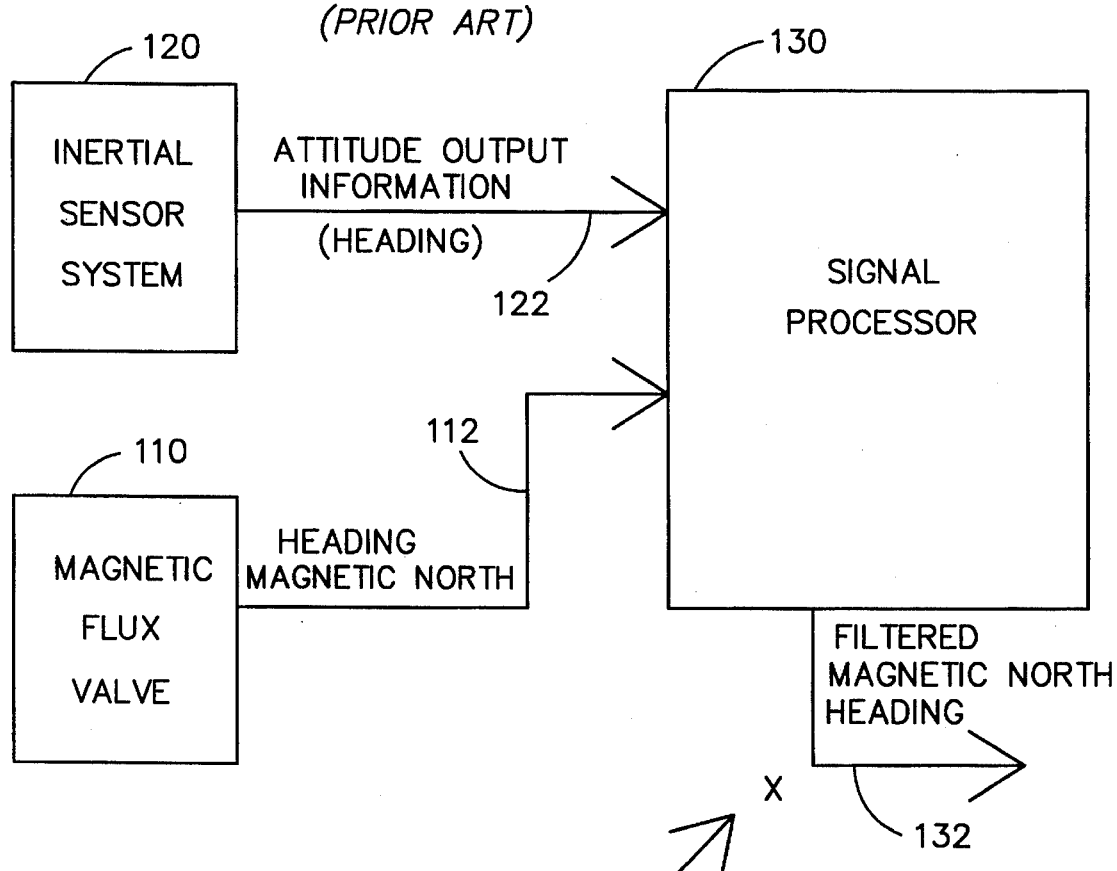
FIG. 1 is a block diagram illustrating a magnetic north heading apparatus of the prior art.

Illustrated in FIG. 1 is a magnetic north heading reference system known in the art. The magnetic north heading reference system includes a magnetic flux valve 110 and an inertial sensor system 120 for providing data inputs to a signal processor 130 which serves as a blending filter to provide a filtered magnetic north heading output indicated by numeral 132. Although not shown, output 132 may be used by other computational or control devices dedicated for navigation and/or flight control of aircraft.

Figure 2:
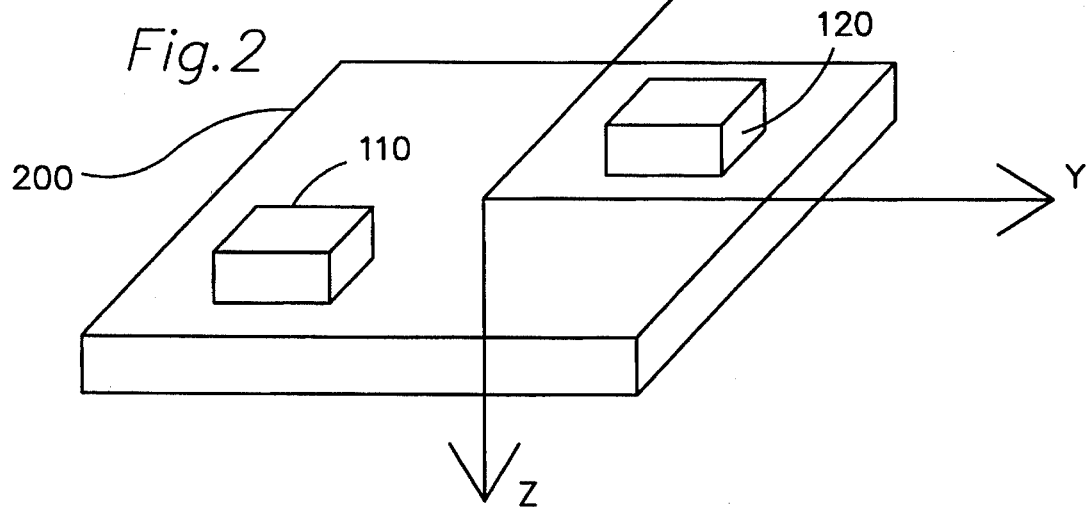
FIG. 2 is a geometric illustration which depicts a platform coordinate reference frame and components of FIG. 1.

In an aircraft application, both magnetic flux valve 110 and inertial sensor system 120 are rigidly fixed to the aircraft herein referred to as a platform 200, as illustrated in FIG. 2, having a platform coordinate reference frame XYZ associated therewith. For exposition purposes, magnetic flux valve 110 has its input axis generally aligned with the X-axis of platform 200 (aligned with the aircraft body axis). Inertial sensor system 120 has its input axes generally aligned with the platform coordinate reference frame, and provides attitude information related to angular rotation about the platform coordinate reference frame axes, where rotation about the X-axis may be arbitrarily defined as the roll angle, rotation about the Y-axis (aligned with the aircraft wings) may be arbitrarily defined as the pitch angle, and rotation about the Z-axis may be arbitrarily defined as the platform heading angle, herein referred to as the body heading. As is well understood in the art, the attitude information provided by the inertial sensor system and the magnetic north information provided by the magnetic flux valve are related to continuous changes of the platform from an initial computational reference frame which may be related to the geocentric position of the platform relative to an earth-centered geographic reference frame and its relation to magnetic north.

Referring again to FIG. 1, magnetic flux valve 110 provides an output 112 indicative of magnetic north heading on the basis of terrestrial magnetism, sometimes referred to as a magnetic compass. The output of magnetic flux valve 110 is provided as one input to signal processor 130. Inertial sensor system 120 provides platform attitude output information derived from a plurality of inertial sensors, generally three accelerometers and three gyroscopes. The inertial sensor system 120 provides the aforesaid attitude output information on information signal line 122 as further inputs to signal processor 130, from which platform pitch, roll and heading angles may be determined.

Signal processor 130 is generally a computational device such as a computer, micro-processor and the like which operates on the input data in accordance with a predetermined filtering or a mathematical algorithm scheme for providing the filtered magnetic north heading. It should be noted that output signals from magnetic flux valve 110 and inertial sensor system 120 may be either analog or digital in form, and as such may comprise one more signal lines as well understood in the art of information processing. Herein, a single signal line or output signal may be one or more signal lines for transferring information from one block to another, and may either be analog or digital in form.

As is well understood in the art, a magnetic flux valve provides good body heading relative to magnetic north under static conditions. However, the magnetic north heading provided by the magnetic flux valve under dynamic conditions, generally behaves poorly, and its output is generally noisy and contains short-term error. Further, a magnetic flux valve generally requires frequent re-calibration, in addition to its inherent deficiencies.

In contrast, an inertial sensor system provides excellent dynamic response to angular rotations of the platform. With respect to a navigation application, the performance requirements for absolute pitch and absolute roll are much less stringent than body heading. This may be generally understood by noting that an aircraft performs infrequent dynamic changes relative to pitch and roll, but generally varies greatly in heading changes during the course of a flight mission. The navigation solution provided by an inertial sensor system is generally limited by the long term accuracy (i.e., low drift, etc.) of the vertical gyro, the gyro aligned with the Z-axis, typically aligned with the vertical axis of the platform generally pointing toward earth center—the angular rotation accuracy about the Z-axis being directly related to body heading accuracy.

As is well known, inertial sensor system 120 commonly employs a plurality of inertial sensing components, more particularly, three gyros and three accelerometers aligned with the primary reference axes. The X-axis and Y-axis gyro components may generally be low performing gyros, and the attitude sensor system outputs may be assisted by an air data sensor information (not shown) for providing velocity information. The air data sensors are used as inputs to the inertial sensor system for drift corrections, as is well understood in the art.

For good performance, the Z-axis gyro (the primary heading angle gyro) needs to have greater accuracy than the X-axis and the Y-axis gyros. However, a compromise commonly practiced in the navigational arts is the employment of signal processor 130 which blends the output of the magnetic flux valve, namely the magnetic north heading, and the attitude outputs of the inertial sensor system package, in a manner so as to provide a good filtered magnetic north heading 132 which is reliable and has both good static and dynamic performance. The aforesaid scheme achieves reasonably good static and dynamic performance with employment of a Z-axis gyro which has a lower accuracy requirement than a navigation grade gyro, and may have the same lower accuracy requirements as the other two gyros.

A magnetic north heading system as just described commonly employs an inertial sensor system generally referred to as an AHRS inertial sensor system, which refers to an "attitude heading reference system." AHRS systems are generally known to be much less accurate than a "navigational grade" sensor system, but are adequate to meet common FAA equipment requirements when combined with air data information and magnetic flux data.

The use of an AHRS system, together with a GPS based positioning system may provide both accurate aircraft pitch and roll information, and accurate knowledge of aircraft position, velocity, and ground track heading. However, for AHRS quality gyros, the ability to determine aircraft true north heading is limited by the drift rate of the vertical gyro, which leads to a monitonically increasing heading error. In accordance with the present invention, GPS-derived information is utilized in a manner specifically designed to allow determination of true north heading and thereby substantially circumvent undesirable AHRS heading error growth tendency, and to replace it with a bounded error characteristic.

Figure 3:
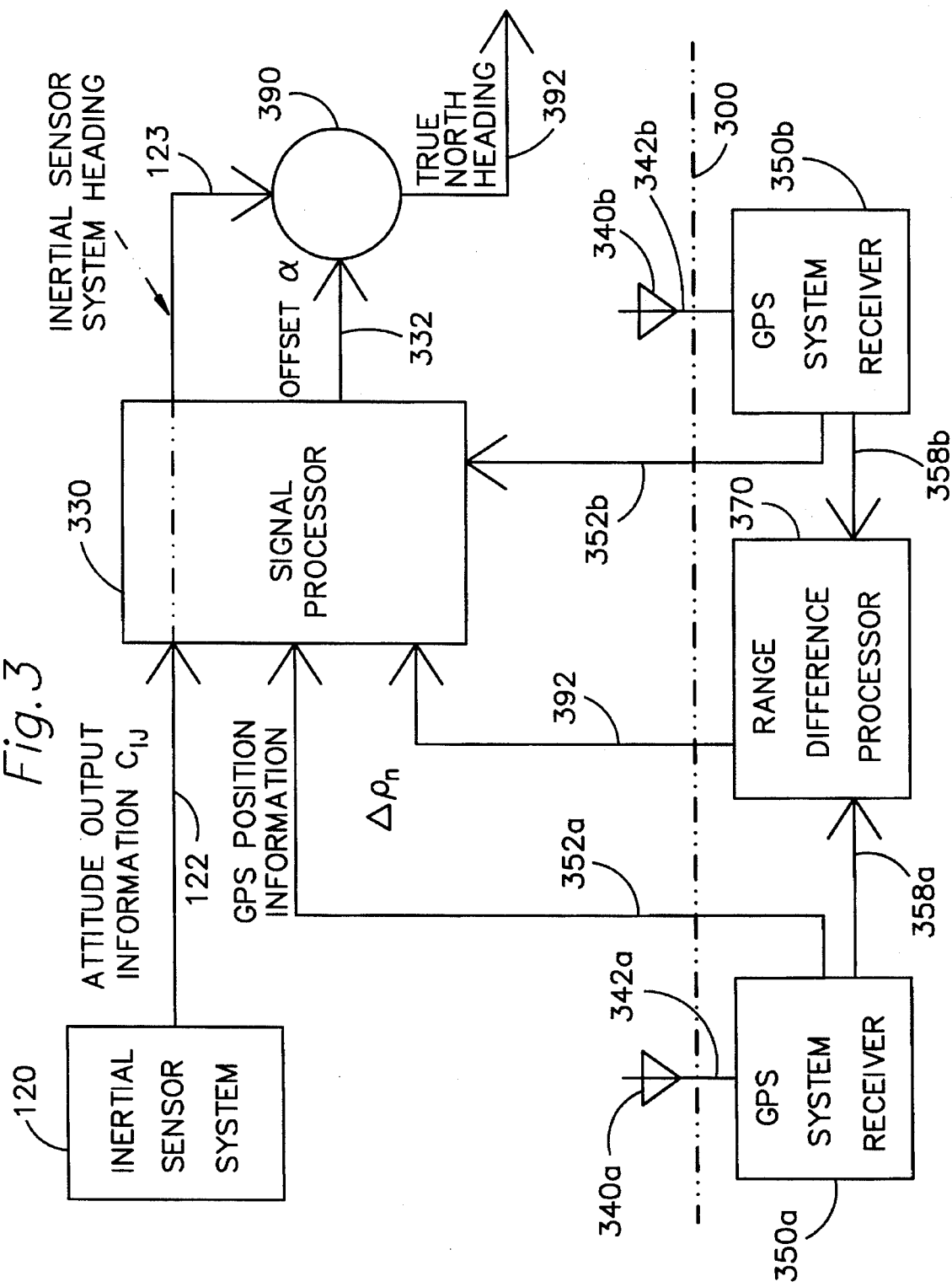
FIG. 3 is a block diagram illustrating an embodiment of the present invention.

Illustrated in FIG. 3 is a true north directional heading information apparatus in accordance with the present invention. The system illustrated in FIG. 3 differs from the system illustrated in FIG. 1 insofar as the magnetic flux valve 110 has been eliminated and replaced by a GPS system receiver system, as will be further described, for providing GPS data as inputs to a signal processor 330 for deriving "true north heading" of a body by combining GPS data with inertial sensor system 120 attitude information. Hereafter, inertial sensor system 120 will be abbreviated as AHRS, an attitude heading reference system as described above.

As illustrated in FIG. 3, thereshown are two physically separated antennae, antenna 340a and antenna 340b, which are rigidly fixed to a platform 300, representing an aircraft body, along with AHRS system 120. The coordinate positions of antennae 340a and 340b are known relative to a known platform coordinate reference frame. Identical GPS receiver systems 350a and 350b separately receive an electrical signal from antennae 340a and antenna 340b, respectively. Accordingly, only receiver system 350a and antenna 340a will be described. The subsequent designations "a" and "b" refers to those signals separately received by either antenna 340a or antenna 340b, and separately processed by either GPS system receiver 350a or 350b.

Again referring to the embodiment of the invention depicted by the block diagram of FIG. 3, antenna 340a is configured to receive satellite information signals from those satellites which form the GPS satellite positioning system and provide an electrical signal 342a indicative of the received signals. Electrical signal 342a is provided as an input to GPS system receiver 350a. GPS system receiver 350a processes electrical signal 342a and provides a receiver output information signal 352a presented as an input to signal processor means 330. Second antenna 340b provides an electrical signal 342b, similar to that provided by antenna 340a, and is presented to GPS system receiver 350b. GPS system receiver 350b processes electrical signal 342b and provides a receiver output information signal 352b presented as an input to signal processor 330.

Before proceeding, it is well understood that the GPS satellite information signal, particularly the carrier signal from each of the satellites, contains coded information therewith which includes, among other information, the satellite vehicle identification number, satellite trajectory information, both ephemeris data and almanac data, from which the geocentric position of the satellites may be determined, as well as other such information. Further, as is common in the NAVSTAR global positioning system, each of the satellites transmits a satellite information signal of the same frequency, but varying pseudo random code. From the pseudo random code, the GPS system receiver 350 identifies the satellite vehicles, tracks the satellite-specific information signals, and determines the satellite specific pseudo ranges. Pseudo ranges, herein, generally refers to the estimated range between the position of the receiving antenna and a particular satellite which are derived from the measured delay time from the time of transmission of the satellite-specific information signal to the time as received by the GPS system receiver.

GPS system receiver 350a, like those commonly known in the art, serve to process the coded information on the satellite information signal from a plurality of satellites for a determination of the estimated position of the antenna. This may be accomplished by a variety of techniques including aforesaid pseudo range measurements or, alternatively, carrier phase measurements. The latter is commonly embedded in GPS system receivers known in the art where the satellite information signal characteristics are preserved and process for the aforesaid carrier phase measurements.

As further understood in the art, GPS system receiver 350a, commonly employed in the art, includes processing components capable of providing output information on receiver output signal line 352a indicative of usual GPS information, including but limited to estimated position of the associated antenna, satellite trajectory information or position, signal measurement time, satellite identification information, pseudo range, pseudo range rate, and other such information. Signal line 352a represents one or more signal lines for transmitting the intended information, preferably in digital form for processing by signal processor 330.

Further, as illustrated in FIG. 3, GPS system receiver 350a provides selected output information on signal line 358a. Like signal line 352a, signal line 358a represents one or more signal lines for transmitting the intended information, preferably in digital form for processing by signal processor 330. As will be more fully understood by way of the description which follows, GPS system receiver 350 provides satellite specific range information on signal line 358a in a selected form. For example, the information may in the form of satellite specific pseudo range values, carrier phase values, or Doppler counts, or the like indicative of the relative range difference between one antenna and one specific satellite.

As illustrated in FIG. 3, output signal lines 358a and 358b are presented as inputs to range difference processor 390 for operating on the satellite specific range information provided by each of the GPS system receivers 350a and 350b for providing range difference information on output signal on signal line 392. The range difference information represents the relative range difference between antennae 340a and 340b derived from satellite information signals from the same satellite as observed by antennae 340a and 340b, at substantially a common measurement time. Signal line 392 is presented as an input to signal processor 330.

In the present invention depicted in FIG. 3, signal processor 330 processes GPS satellite and antenna position information derived from GPS system receivers 350a and 350b, relative range difference information as observed by the two antennae, and AHRS attitude information from AHRS 120 in accordance with a pre-selected estimator, e.g., a simple 3-state Kalman Filter, for determining the angular offset between the indigenous AHRS reference frame and a geographic reference frame.

In the present invention, signal processor 330 makes use of GPS derived satellite-specific range difference information which describes the relative difference in position of the pair of antennae in relation to a specific satellite. Two techniques will be described for determining the satellite-specific range difference information. The first technique uses satellite-antenna-specific pseudo range measurements from which a satellite-specific pseudo range difference measurement is obtained, while the second technique uses satellite-antenna-specific pseudo range-rate measurements from which a satellite-specific pseudo range rate difference measurement is obtained. The two techniques may be used separately or in combination, since the filter structure and states are similar for both types of measurements.

Heading Determination Using Satellite-Specific Pseudo Range Difference Measurements In the following exposition, it is assumed that pseudo range measurements to the same satellite at substantially the same measurement time are available from the combination of the two antennae 340a and 340b, and corresponding receivers 350a and 350b, respectively. It is further assumed that the positions of the antennae relative to the platform reference frame, with a preselected separation distance between the antennae, are also known, and a line passing through the antennae pair has a selected orientation relative to an arbitrarily selected heading axis of the platform coordinate reference frame. Further, it is assumed that AHRS 120 attitude matrix information relative to the AHRS computational coordinate reference frame is available with the pseudo range measurements at substantially the same pseudo range measurement time.

Figure 4:
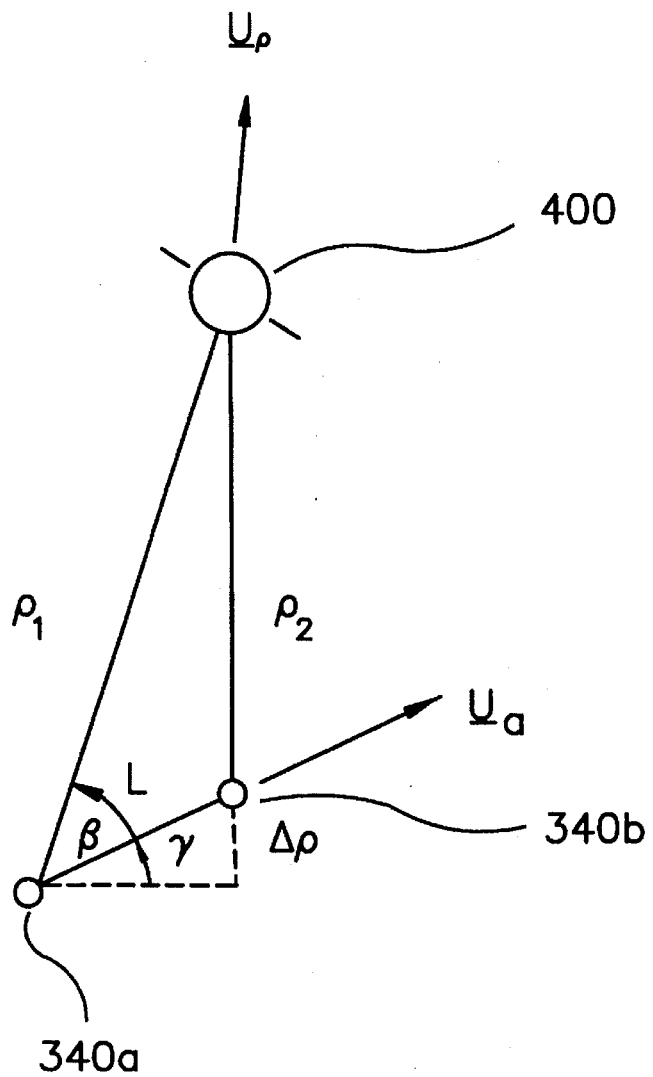
FIG. 4 illustrates heading determination geometry.

The geometry of the heading determination problem is as depicted in FIG. 4. Thereshown are antennae 340a and 340b, and their geometric relationship with one satellite 400 of the GPS constellation of satellites. The angle $\gamma$ may be approximated to a high degree of accuracy (given that the distance to the satellite is much greater than the distance between the two antennae) from the relationship:

$$\sin\gamma = \frac{\Delta\rho}{L} \qquad (1)$$

where $\Delta\rho$ is the range difference between the two synchronized pseudo ranges (same measurement time) to a given satellite, defined by $$\Delta\rho = \rho_1(t_m) - \rho_2(t_m) \qquad (2)$$

where L is the known distance between the two antennae of the antenna pair, 340a and 340b, "$t_m$" is the synchronized measurement time, and $\rho_1$ is the pseudo range measurement derived from the satellite information signal transmitted from one specific satellite, e.g. satellite 400, and received by one antenna 340a and processed by GPS system receiver 350a, and $\rho_2$ is the pseudo range measurement derived from a satellite information signal from the same one specific satellite and received by the other antenna of the antennae pair, namely antenna 340b, and processed by GPS system receiver 350b.

In the preferred embodiment of the invention, the synchronized pseudo range measurements at the common measurement time $t_m$ is desirable and is commonly done in the art where a synchronized measurement time is utilized for synchronizing the pseudo range measurements to a plurality of satellites for determining a line of sight matrix between a single antenna and a plurality of satellites whereby the estimated position of the antenna may be determined, and the integrity of the results may also be determined. Accordingly, the chosen synchronization scheme is not shown herein in order to simplify the present exposition without obfuscating the present invention. Further, the synchronized measurement time will be implied and not be expressed in the following mathematical analysis expressing both GPS information and AHRS attitude information.

Continuing, the fact that the pseudo range measurement, $\rho$, for either antenna location is much larger than the antennae separation distance, L, allows the following scalar-product relationship to be written:

$$\underline{U}_\rho \cdot \underline{U}_a = \cos\beta = \sin\gamma = \frac{\Delta\rho}{L} \tag{3}$$

where $U_\rho$=unit vector from aircraft to satellite, and $U_\alpha$=unit vector along the line connecting the two antennas.

It should be noted here that unit vector $U_\rho$ from the aircraft, i.e. platform 300, to the satellite 400 may be arbitrarily determined from either antennae 340a or 340b, or another location on platform 300, since their separation relationship is very much closer than the distance to the satellite. However, for enhanced accuracy, although not necessarily needed, the average GPS estimated position of the antennae pair may be utilized. In the following exposition, only the estimated position of one antenna is implied since the separation distance L is generally small in comparison to the distance to the satellite, and that is within the skill of the artisan to average antennae positions if desired.

Figure 5:
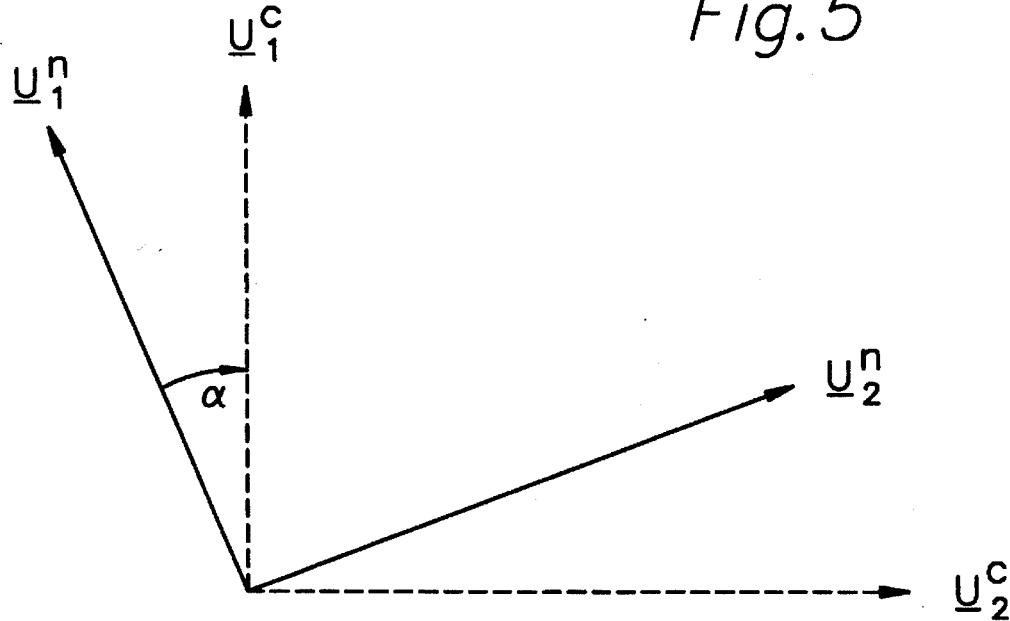
FIG. 5 illustrates the geometric relationship between the AHRS computational reference frame and the geographic reference frame.

Referring now to FIG. 5, it may be seen that the local-level reference frame indigenous to the AHRS system 120 is related to the local-level geographic reference frame by the azimuth rotation angle, $\alpha$, which leads to the transformation matrix between the two frames as:

$$\begin{bmatrix} \underline{U}_1^n \\ \underline{U}_2^n \\ \underline{U}_3^n \end{bmatrix} = \begin{bmatrix} \cos\alpha & -\sin\alpha & 0 \\ \sin\alpha & \cos\alpha & 0 \\ 0 & 0 & 1 \end{bmatrix} \begin{bmatrix} \underline{U}_1^c \\ \underline{U}_2^c \\ \underline{U}_3^c \end{bmatrix} \tag{4}$$

where $U_1^c$, $U_2^c$, $U_3^c$=orthogonal unit vector triad defining the AHRS coordinate reference frame, and $U_1^n$, $U_2^n$, $U_3^n$=orthogonal unit vector triad defining the navigation reference frame.

If an all-earth heading determination capability is desired, two navigation reference frames need to be utilized—a North/East/Down frame outside the polar regions, and a Grid North/Grid East/Down frame in the polar regions. Therefore, $\alpha$ can have two distinct meanings depending on aircraft latitude.

The transformation between the aircraft body-axis unit-vector and the AHRS coordinate reference frame unit-vector triad is defined by:

$$\begin{bmatrix} \underline{U}_1^c \\ \underline{U}_2^c \\ \underline{U}_3^c \end{bmatrix} = \begin{bmatrix} c_{11} & c_{12} & c_{13} \\ c_{21} & c_{22} & c_{23} \\ c_{31} & c_{32} & c_{33} \end{bmatrix} \begin{bmatrix} \underline{U}_1^b \\ \underline{U}_2^b \\ \underline{U}_3^b \end{bmatrix} \tag{5}$$

where $U_1^b$, $U_2^b$, $U_3^b$=orthogonal unit vector triad defining the aircraft body axes (the same as the platform coordinate reference frame).

$c_{ij}$=attitude matrix elements determined by the AHRS system, also related to the platform reference frame.

Combining (4) and (5) yields the following transformation between the aircraft body-axis unit-vector triad and the unit-vector triad defining the geographic reference frame:

$$\begin{bmatrix} \underline{U}_1^n \\ \underline{U}_2^n \\ \underline{U}_3^n \end{bmatrix} = \begin{bmatrix} \cos\alpha & -\sin\alpha & 0 \\ \sin\alpha & \cos\alpha & 0 \\ 0 & 0 & 1 \end{bmatrix} \begin{bmatrix} c_{11} & c_{12} & c_{13} \\ c_{21} & c_{22} & c_{23} \\ c_{31} & c_{32} & c_{33} \end{bmatrix} \begin{bmatrix} \underline{U}_1^b \\ \underline{U}_2^b \\ \underline{U}_3^b \end{bmatrix} \tag{6}$$

Now assume, as one possibility, that the two antennae are mounted along the aircraft Y-body-axis so that the unit vector $U_\alpha$, as defined in FIG. 4, may be determined directly by multiplying out the two matrices in (6) and expressing the Y-body-axis unit vector in terms of the unit vectors defining the geographic reference frame. This results in the following:

$$U_\alpha = U_2^b = (c_{12}\cos\alpha - c_{22}\sin\alpha)U_1^n + (c_{12}\sin\alpha + c_{22}\cos\alpha)U_2^n + c_{32}U_3^n \tag{7}$$

Referring to FIG. 4, the unit vector from the aircraft (i.e., either antenna, or an average position between the two, or the like) to the satellite, $U_\rho$, is determined from a knowledge of the satellite's position in an earth-centered frame, and that of the aircraft (also in an earth-centered frame). The equations which define the unit vector $U_\rho$, are given as follows:

$$\rho = \sqrt{(X_s - X)^2 + (Y_s - Y)^2 + (Z_s - Z)^2} \tag{8}$$

$$\underline{U}_\rho = \underline{\rho}/\rho \tag{9}$$

$$\underline{\rho} = C_e^n \begin{bmatrix} X_s - X \\ Y_s - Y \\ Z_s - Z \end{bmatrix} \tag{10}$$

where $X_s$, $Y_s$, $Z_s$ are the satellite coordinates in the earth-centered frame, as determined from the GPS satellite ephemeris data derived from the satellite information signals; "X, Y, Z" are the aircraft coordinates in the earth-centered frame, as determined from the GPS position information; and $C_e^n$ is the transformation matrix from the earth-centered frame to the local-level navigation reference frame.

For further understanding of the following exposition, and particularly the transformation matrix $C_e^n$, reference is made to a paper entitled, "An All-Earth Inertial Navigation Scheme", by M. B. Ignagni, Navigation: Journal of the Institute of Navigation, Vol. 19, No. 3, Fall 1972, herein incorporated by reference thereto.

The equations defining the aircraft's position coordinates in the earth-centered frame are defined in terms of aircraft latitude, $\lambda$, aircraft longitude, $\Lambda$, aircraft altitude, h, and the distance from the center of the earth to its surface, $R_e$, as follows:

$$X = (R_e + h) \cos \lambda \cos \Lambda$$

$$Y = (R_e + h) \cos \lambda \sin \Lambda$$

$$Z = (R_e + h) \sin \lambda \quad (11)$$

The transformation matrix $C_e^n$, from the earth-centered frame to the geographic reference frame is defined for the case where the geographic reference frame is a North/East/Down frame by:

$$C_e^n = \begin{bmatrix} \sin\lambda\cos\Lambda & \sin\lambda\sin\Lambda & \cos\lambda \\ \sin\Lambda & \cos\Lambda & 0 \\ -\cos\lambda\cos\Lambda & -\cos\lambda\sin\Lambda & -\sin\lambda \end{bmatrix} \quad (12)$$

and, when the geographic reference frame is the Grid North/Grid East/Down frame, the transformation matrix, $C_e^n$ is defined by:

$$C_e^n = \begin{bmatrix} -\cos\sigma\sin\lambda\cos\Lambda - \sin\Lambda\sin\sigma & -\cos\sigma\sin\lambda\sin\Lambda + \cos\Lambda\sin\sigma & \cos\sigma\cos\lambda \\ \sin\sigma\sin\lambda\cos\Lambda - \sin\Lambda\cos\sigma & \sin\sigma\sin\lambda\sin\Lambda + \cos\Lambda\cos\sigma & -\sin\sigma\cos\lambda \\ -\cos\lambda\cos\Lambda & -\cos\lambda\sin\Lambda & -\sin\lambda \end{bmatrix} \quad (13)$$

where the angle $\sigma$, which is the offset between grid north and true north, is defined by $$\sin\sigma = \frac{\sin\lambda\sin\Lambda}{[1 - \cos^2\lambda\sin^2\Lambda]^{1/2}} \quad (14)$$

$$\cos\sigma = \frac{\cos\Lambda}{[1 - \cos^2\lambda\sin^2\Lambda]^{1/2}}$$

Finally, the scalar product defined by (3) is carried out utilizing the results defined by (8), (9), and (10), with the result being expressed by $$\frac{\Delta\rho}{L} = (c_{12}\cos\alpha - c_{22}\sin\alpha)d_1 + (c_{12}\sin\alpha + c_{22}\cos\alpha)d_2 + c_{32}d_3 \quad (15)$$

where, for convenience, the components of the unit $U_\rho$ vector in the geographic reference frame are denoted by $d_1$, $d_2$, and $d_3$, or, explicitly $$U_\rho = d_1 U_1^n + d_2 U_2^n + d_3 U_3^n \quad (16)$$

Rearranging (16), a form more suitable for a Kalman Filter measurement equation can be derived as follows:

$$y = \frac{\Delta\rho}{L} - c_{32}d_3 = (d_1 c_{12} + d_2 c_{22})\cos\alpha + (-d_1 c_{22} + d_2 c_{12})\sin\alpha \quad (17)$$

Equation (17) can be expressed in the standard form associated with scalar Kalman Filter measurements as follows:

$$y = hX + \zeta \quad (18)$$

where y = measurement h = measurement matrix

X = vector of unknowns $\zeta$ = measurement error in which $$h = [(d_1 c_{12} + d_2 c_{22}), (-d_1 c_{22} + d_2 c_{12}), 0] \quad (19)$$

and $$X = \begin{bmatrix} \cos\alpha \\ \sin\alpha \\ b \end{bmatrix} \quad (20)$$

and where the error state "b" is the estimate of the vertical gyro bias.

The inclusion of a state that accounts for the vertical gyro bias (which, as noted earlier, may be considerable for AHRS quality gyros) allows the Kalman Filter not only to estimate the bias—which may be of value in self-calibration of the system—but, more importantly, prevents the bias from contaminating the estimates of $\sin\alpha$ and $\cos\alpha$.

The above mathematical analysis describes the technique for determining the trigonometric values of the angle $\alpha$ as a function of the separation distance "L" between the two satellite signal receiving antennae (340a and 340b), the range difference $\Delta\rho$, the inertial sensor system (AHRS) attitude information described by the matrix $C_{ij}$, and the unit vector $U_\rho$, between the antenna and the satellite which is a function of the GPS derived estimated position of the antenna and the satellite vehicle's position.

Figure 6:
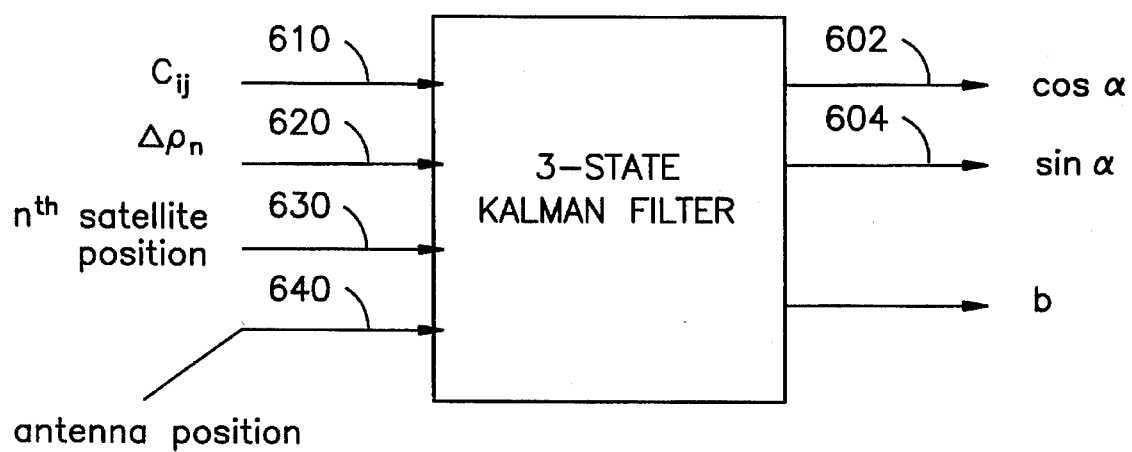
FIG. 6 is a block diagram illustrating inputs and outputs of a signal processor in accordance with present invention.

FIG. 6 illustrates further details of the inputs to signal processor 330 which is configured to implement a 3-state Kalman Filter 600. Kalman Filter 600 receives as inputs (i) the attitude matrix information $C_{ij}$ indicated by numeral 610 (information from inertial sensor system 120 on signal line 122), (ii) the relative pseudo range difference measurement $\Delta\rho_n$ indicated by numeral 620 (range difference value from range difference processor 370 on signal line 392), (iii) the GPS derived geocentric position of the nth satellite indicated by numeral 630, and (iv) the GPS derived geocentric position of one of the antennae, or an average thereof, indicated by numeral 640—in terms of latitude, longitude, and altitude (the latter two pieces of information from either of GPS system receivers 350a or 350b). All of the above information is assumed to be synchronized to the a common measurement time for proper evaluation of the data for arriving at the intended heading.

The Kalman Filter 600 provides as outputs the sine and cosine of the offset angle a designated 602 and 604, respectively, from which the offset angle $\alpha$ may be determined so that the aircraft true north heading may be known when used in combination with the AHRS attitude matrix information, and particularly the AHRS heading angle value. The $\cos\alpha$ and $\sin\alpha$ are slowly varying quantities that vary due to the natural precession rate of the geographic and AHRS system 120 coordinate reference frames, and due to the AHRS system 120 azimuth gyro drift. These may be modeled in the Kalman Filter as slowly varying random-walk processes. Note, however, that unless the geographic reference definition is changed at higher latitudes (Grid North/Grid East/Down), the processional rate of the frame will increase—possibly to a very high value exceeding the capability of the Kalman Filter to track. Therefore, the switch in frames is needed to insure that the $\cos\alpha$ and $\sin\alpha$ values are well behaved, and may be effectively tracked at all times.

An important consideration in implementing the approach defined above is the means used to measure the satellite-specific pseudo range differences $\Delta\rho_n$ to the various satellites in view at any given time. One technique for determining the pseudo range differences $\Delta\rho$ is simply comparing the pseudo ranges derived from the coded information on the satellite information signal. These pseudo range measurements, presented as inputs to range difference processor 370, may be "carrier smoothed" pseudo ranges utilizing carrier Doppler measurement, a well-known technique for enhancing the accuracy of the pseudo range measurements. State of the art receivers can measure pseudo range measurements such that the pseudo range differences are within an accuracy of 1 to 2 meters 1 $\sigma$ (assuming compensation for slowly varying differential clock errors). Measurement errors on this order would necessitate an antennae separation distance of on the order of 5 to 10 meters for good convergence of the aircraft heading estimation.

The satellite specific pseudo range difference values $\Delta \rho_n$ may also be determined by another technique using the phase difference between the carrier signals received at the two antennae locations. This alternate technique for obtaining relative range measurements between each of the antennae and a specific satellite is also represented by the output signal line 358a and 358b as illustrated in FIG. 3. In this situation, the carrier signals obtained by antennae 340a and 340b are independently processed for obtaining carrier phase information at a selected measurement time by receivers 350a and 350b. In turn, range difference processor 370 operates on the phase measurements by the two GPS system receivers 350a and 350b for determining their phase difference—which is indicative of the satellite-specific relative range difference. Carrier phase measurements as described are commonly performed in commercially available GPS system receivers in manner well known to those skilled in the art of GPS system receiver design.

As said earlier, the carrier phase difference is mathematically related to the pseudo range difference by:

$$\Delta \rho = \frac{\Delta \phi}{2\pi} w$$

where $\Delta \phi$=phase difference between the two carrier signals
w=wavelength of carrier signal (0.18 meters)

The potential cycle ambiguity associated with this technique requires additional information in order to be resolved, which is possible only after an initial estimate of aircraft heading becomes available. In order to avoid cycle ambiguity, it is only necessary to know heading to an accuracy such that the heading error times half the distance between the two antennas is less than half the carrier wavelength. However, cycle slipping during the initial heading determination will tend to average out over the set of satellites being used during this period, since each has a different orientation relative to the antenna baseline. Therefore, cycle slipping should not prevent the heading error from being reduced from its initial value to a value small enough to eliminate the potential for cycle ambiguity altogether. Due to the greater precision that is possible in measuring the phase difference between the two carrier signals, a relatively short baseline between the two antennas should be possible.

A possibility for resolving the cycle ambiguity altogether is to separate the antennas by less than one half wavelength (about 3.75 inches for NAVSTAR). Then, it is true that the value of $\Delta \rho$ can never physically exceed ½ wavelength [as is evident from equation (1)]. Therefore, the measured phase difference in the two carrier signals may be used without error in deriving the pseudo range difference.

Because pseudo range differs from true range, as a result of errors in the receiver's clock, the measurement equation as given above will also include a contribution due to the clock errors in each of the two receivers used in forming the range difference, $\Delta \rho$. The differential receiver clock drift can be modeled by a linear system, and appended to the Kalman Filter; however, this has the disadvantage of adding more states to the Kalman Filter, which increases the computational load. A second disadvantage is that the effect of the differential clock drift between the two receivers can only be modeled approximately, which limits the overall accuracy achievable in the azimuth determination process.

To eliminate the effect of differential clock drift in the two receivers, a technique referred to as "double differencing" can be utilized to advantage. This technique forms a sequence of measurements to be processed by the Kalman Filter consisting of the differences in all available measurements, of the type defined by (17), over the set of satellites that are visible at any given time. This double differencing technique totally eliminates systematic differential clock drift errors since, in fact, this error contribution is the same for all satellites in view. The double differencing technique leads to the following modified measurement equation, which replaces Equation (17):

$$y = \frac{(\Delta \rho^i - \Delta \rho^j)}{L} - c_{32}(d_3^i - d_3^j) = [(d_1^i - d_1^j)c_{12} + (d_2^i - d_2^j)c_{22}]\cos\alpha + \quad (17a)$$

$$[(d_2^i - d_2^j)c_{12} - (d_1^i - d_1^j)c_{22}]\sin\alpha$$

where i and j designate specific satellites, and the measurement sequence is carried out for all visible satellites, over the range of the indices i and j defined by i=1 to $N_{sat}-1$ and j=2 to $N_{sat}$ in which $N_{sat}$ is the number of satellites in the constellation.

Heading Determination Using Satellite-Specific Pseudo Range Rate Difference Measurements Another technique which may be used either in combination with the two techniques already described above, or as an alternative to it, involves using pseudo range-rate difference which is also related to the pseudo range differences $\Delta \rho_n$. The carrier signals received at the two antennas 340a and 340b will differ due to the difference in their Doppler shifts relative to the two antennae. The Doppler shifts differ between the two antennae locations due mainly to the angular rates being experienced by the aircraft. Therefore, since there is almost always some sustained low-level aircraft angular motion activity, and since the Doppler shifts in the two carrier signals can be determined very accurately (via the integrated Doppler counts), a means exists for determining aircraft heading by a technique similar to that discussed above, which used pseudo range difference measurements directly or by the carrier phase difference measurement.

In the alternate technique as just described, the relative satellite specific pseudo range difference values $\Delta \rho_n$ may be determined using the integrated Doppler counts derived from the carrier signals observed by the two antennae locations. This alternate technique for obtaining relative range measurements between each of the antennae and a specific satellite is also represented by the output signal line 358a and 358b as illustrated in FIG. 3. In this situation, the carrier signals obtained by antennae 340a and 340b are independently process for obtaining the integrated Doppler count information for a selected time interval at a selected measurement time by receivers 350a and 350b. In turn, range difference processor 370 operates on the integrated Doppler count information from the two GPS system receivers 350a and 350b for determining their difference—which also is indicative of the satellite-specific relative range difference. Integrated Doppler count measurements as described are commonly performed in commercially available GPS system receivers in manner well known to those skilled in the art of GPS system receiver design.

The equation governing the rate of change of the range from the aircraft to the satellite, $\dot{\rho}$, is the following:

$$\dot{\rho}=(V_s-V)\cdot U_\rho \tag{21}$$

where $V_s$=satellite velocity vector
$V$=aircraft velocity vector
$U_\rho$=unit vector from aircraft to satellite The difference in the values of $\dot{\rho}$ at the two antenna locations may be determined from equation (21) by observing that the satellite velocity vector is the same for both antennas, and that the aircraft velocity for the two differ only as a result of the angular velocity of the aircraft, which leads to the difference in the two values of $\dot{\rho}$ as $$\Delta\dot{\rho}=L(\omega\times U_\alpha)\cdot U_\rho \tag{22}$$

where $\omega$=angular velocity vector of the aircraft
$U_\alpha$=unit vector along the line connecting the two antennas
$L$=distance between the two antennas There is also another small contribution $\Delta\dot{\rho}$ arising from the difference in orientation of the two pointing vectors, from the antennae to the satellite, coupled with the orbital rate of the satellite. This effect is small enough to be ignored, however, and so the result given by (22) can be used as the basis for determining aircraft heading.

Returning to (22), both $\omega$ and $U_\rho$ must be expressed in a common computational coordinate reference frame—the geographic reference frame being the natural choice. The vector $\omega\times U_\rho$ is expressed first in the aircraft body frame as follows:

$$\underline{\omega}\times\underline{U}_a = \begin{bmatrix} U_1^b & U_2^b & U_3^b \\ p & q & r \\ 0 & 1 & 0 \end{bmatrix} \tag{23}$$

where the $U_1^b$ are the unit vectors defining the body axes; p, q and r are aircraft body rates; and the unit vector $U_\alpha$ is defined as in the previous discussion to be along the aircraft Y body axis. Carrying out the cross-product operation leads to the result:

$$\omega\times U_\alpha = -rU_1^b + pU_3^b$$

The cross-product term may be expressed in the geographic reference frame by using the transformation matrix defined by (6), with the following results:

$$\underline{\omega}^n\times\underline{U}_a^n = \begin{bmatrix} \cos\alpha & -\sin\alpha & 0 \\ \sin\alpha & \cos\alpha & 0 \\ 0 & 0 & 1 \end{bmatrix}\begin{bmatrix} c_{11} & c_{12} & c_{13} \\ c_{21} & c_{22} & c_{23} \\ c_{31} & c_{32} & c_{33} \end{bmatrix}\begin{bmatrix} -r \\ 0 \\ p \end{bmatrix} \tag{25}$$

Substituting (25) and (22), carrying out the indicated operations, and collecting terms, lead to the following measurement equation:

$$y=\Delta\dot{\rho}-Ld_3(-rc_{31}+pc_{33})=f_1\cos\alpha+f_2\sin\alpha \tag{26}$$

where $f_1$ and $f_2$ are defined by:

$$f_1=L[d_1(-rc_{11}+pc_{13})+d_2(-rc_{21}+pc_{23})]$$

$$f_2=-L[d_1(-rc_{21}+pc_{13})+d_2(-rc_{11}+pc_{23})]$$

and the $d_i$ are the components of the unit vector $U_\rho$ expressed in the geographic reference frame [see equation (16)].

The measurement matrix for differential pseudo range-rate processing is as follows:

$$h=[f_1,\ f_2,\ 0] \tag{27}$$

The above discussion assumes the availability of pseudo range-rate measurements from each receiver. What is actually obtained is the integral of pseudo range rate over successive intervals of time (integrated Doppler counts) as is well known in basic GPS receiver design. This being true, the measurement relationship defined by (26) takes the form:

$$y=\Delta S_{\dot{\rho}}-Ld_3\Delta c_{32}=g_1\cos\alpha+g_2\sin\alpha \tag{28}$$

where $\Delta S_{\dot{\rho}}$ is the time difference in the integrated range rates measured by the two receivers over a given interval of time, the $g_1$ and $g_2$ are defined by $$g_1=L(d_1\Delta c_{12}+d_2\Delta c_{22})$$

$$g_2=L(d_2\Delta c_{12}-d_1\Delta c_{22})$$

where, as before, L is the separation between the two antennae and $d_i$ are the components of the unit vector $U_\rho$, and the $\Delta c_{ij}$ are the AHRS-derived attitude matrix changes over the selected interval.

The measurement equation for the pseudo range-rate difference approach is defined by:

$$h=[g_1,\ g_2,\ 0] \tag{29}$$

where $\Delta t$ is the time interval associated with the Doppler integration process.

As before, GPS system processors 350a and 350b are intended to perform the appropriate processing of the specific carrier signals and provide as an output on signal line 358a and 358b, respectively, the satellite specific information for subsequent differencing by range difference processor 370.

From the foregoing mathematical analysis, it should be evident that the use of pseudo range-rate differences in heading determination is seen to fit the same structure established for the case where pseudo range differences are used. Therefore, both types of measurements in the heading determination process is intended to be within the scope of the present invention, as well as any other measurements related to the satellite-specific relative range difference between each antenna of the pair of antennae and the same satellite.

It should be noted that pseudo range-rate measurements are effective only when the aircraft is undergoing some angular motion during the Doppler integration interval. However, even a sustained low-level of aircraft angular motion activity should be sufficient to make the heading error observable, and maintain bounded error once it has converged—this being a result of the very precise nature of the Doppler integration process. An antenna baseline of 1 to 2 meters for the pseudo range-rate approach should be reasonable.

As discussed earlier, the use of a double differencing-technique is required to eliminate any dependence of the azimuth estimation on differential clock drift error. As applied to integrated range rate measurement processing the following modified measurement equation, which replaces Equation (28), applies:

$$y=(\Delta S_{\dot{\rho}}^i-\Delta S_{\dot{\rho}}^j)-L(d_3^i-d_3^j)\Delta c_{32}=g_1\cos\alpha+g_2\sin\alpha \tag{28a}$$

where $g_1$ and $g_2$ are now defined by $$g_1 = L[(d_1^i - d_1^j)\Delta c_{12} + (d_2^i - d_2^j)\Delta c_{22}]$$

$$g_2 = L[(d_2^i - d_2^j)\Delta c_{12} - (d_1^i - d_1^j)\Delta c_{22}]$$

The application of the method and operation of the system as mathematically described above will now be discussed. Normally, aircraft true north heading will be known initially while the aircraft is stationary on the ground, at least approximately, by slewing the inertial sensor system 120 coordinate reference frame to magnetic north using the cockpit compass as an indicator of aircraft heading relative to magnetic north. This is also true if an in-air start is required after a long period of power outage. For short power outages, the values of $\cos\alpha$, $\sin\alpha$ and the AHRS attitude matrix just prior to power outage may be saved and used for re-initialization.

It is also possible to initialize aircraft heading using GPS-derived track heading. The approach is described as follows. The initialization of the estimates for $\cos\alpha$ and $\sin\alpha$ is possible to a high degree of accuracy for the normal scenario where GPS measurements are available during the period when the aircraft if moving on the ground prior to takeoff. When this is true, the aircraft heading is the same as its track heading, as determined from the GPS-derived velocity. Therefore, it is possible to use the same 3-state Kalman Filter structure defined above to process two alternate measurements that may be used when aircraft velocity is greater than about 10 ft/sec, but less than around 100 feet/sec. The measurement equations simply relate the AHRS velocity components in the indigenous AHRS reference frame to the GPS-derived velocity components in a North/East/Down frame. The result is as follows:

$$V_n = V_x \cos\alpha - V_y \sin\alpha \tag{30}$$

$$V_e = V_x \sin\alpha + V_y \cos\alpha \tag{31}$$

where $V_n$ and $V_e$ are the north-referenced GPS-derived velocity components, and $V_x$ and $V_y$ are the AHRS-derived velocity components in the indigenous AHRS reference frame.

Equations (28) and (29) lead to two measurement relationships of the same form defined by (18) and (20). The measurement matrices are defined by:

$$h = [V_x, -V_y, 0]$$

$$h = [V_y, V_x, 0]$$

The use of these two additional measurements, while the aircraft is in its taxi and takeoff phases, will lead to a very precise initial estimate of heading. If the measurements are applied during an in-air start, the result will generally not be as good, with the error in the estimate offset angle $\alpha$ being equal to the drift angle resulting from local wind speed conditions.

In the above mathematical analyses, the Kalman Filter illustrated by block 600 in FIG. 6 and incorporated by signal processor 330 as illustrated in FIG. 3, provides an output on signal line 332 related to offset angle $\alpha$ (same as outputs 602 and 604 of FIG. 6). In turn this angular information is provide on signal line 332 and presented as an input to summing processor 390 for correcting the AHRS system heading angle indicated by signal line 123 and thereby provide the true north heading angle on output signal line 392 for subsequent utilization by processors and display devices not shown.

Thus, in the present invention, aircraft true north heading is obtained by using common GPS position data, satellite-specific relative range difference as observed by two antennae separated by a known separation distance, together with an AHRS attitude matrix, and processing this information in a Kalman Filter. The satellite-specific relative range difference may be obtained by a variety of techniques including, but not limited to synchronized pseudo range pairs, carrier phase difference, and pseudo range rate differences derived, for example, from Doppler shift data observed by the two antennae. The satellite-specific relative pseudo range difference values may be ascertained using either the transmitted code, the carrier phase, or the Doppler shift, as required.

Since many pseudo range pairs may be processed as are available at each GPS update or measurement time throughout a flight mission, a dedicated 3-state Kalman Filter allows the pseudo range pairs to be processed in a sequential manner, leading to optimal estimation accuracy for aircraft true north heading.

The apparatus and method in accordance with present invention has been described with reference to particular mathematical expressions and components well understood in the art. The present invention has been described in terms of schematic block diagrams employing a pair of GPS antennae and a pair of GPS system receivers. However, additional antennae and GPS system receiver combinations and appropriate filtering is intended to be within the true spirit and scope of the present invention. Further, multiplexing a single GPS receiver is also envisioned to be within the scope of the present invention.

It should be recognized that the schematic block diagrams particularly illustrated in FIGS. 1, 3, and 6 may be configured by employment of many electronic subsystems, computers, and software/firmware implementations. More specifically, as particularly illustrated in FIG. 6 and the above identified equations may be implemented by any computational device known in the art. As is well understood in the art, a single electronic/software subsystem may be employed for performing the appropriate calculations and generation of the heading angle offset so as to arrive at a true north heading angle in accordance with the present invention.

Although a Kalman filter has been suggested as the preferred method of processing the AHRS attitude information along with the particular GPS position information and relative range difference values, other such schemes are also intended to be within the true spirit and scope of the present invention.

Lastly, although the present invention is intended to be operative with the NAVSTAR GPS system, other satellite positioning systems are also within the true spirit and scope of the present invention. More specifically, any such satellite system by which an aircraft may obtain geocentric position information from satellite information signals, is intended to be within the true spirit and scope of the present invention.

The embodiments of an invention in which an exclusive property or right is claimed are defined as follows:

1. A true north directional heading information apparatus for determining the true north heading of a platform, said apparatus comprising:

global positioning system having, first and second antennae rigidly fixed to a platform, separated by a known separation distance, and there being a line passing through the positions of said antennae having a known orientation relative to a platform coordinate reference frame, said first and second antennae providing first and second electrical signals, respectively, in response to received satellite information signals transmitted from selected satellites, which form, in part, a satellite based global positioning system, and in which each satellite information signal is comprised of a carrier signal containing coded information therewith, signal receiver means responsive to said first and second electrical signals for deriving, therefrom, information representative of (i) an estimated geocentric position of said platform at specific measurement times, and (ii) the geocentric position of said plurality of selected satellites at said specific measurement times, and (iii) first satellite-specific relative range values corresponding to the satellite-specific range between said first antenna and each of said selected satellites at said specific measurement times, and (iv) second satellite-specific relative range values corresponding to the satellite-specific range between said second antenna and each of said selected satellites at said specific measurement times;

range difference processor means responsive to said first and second satellite-specific relative range values for determining satellite-specific relative range difference values, where each satellite-specific relative range difference value is related to the difference between (a) the range between said first antenna and a specific satellite transmitting the corresponding satellite information signal and (b) the range between the second antenna and the same satellite, at substantially said specific measurement times;

an inertial sensor system, having a plurality of inertial sensors rigidly fixed to said platform, for providing attitude information related to first, second, and third angles of rotation corresponding to the platform pitch, roll, and heading angles, respectively, of said platform relative to an initially established orthogonal computational coordinate reference frame; and information processing means for operating on said information representative of
(i) said estimated geocentric position of said platform,
(ii) said geocentric position of said selected satellites,
(iii) said satellite-specific relative range difference values,
(iv) said known antennae separation distance, and
(iv) said attitude information, for determining a heading offset angle, where said heading offset angle is the difference between said platform heading angle and substantially the true north heading angle of said platform whereby said true north heading angle is determined.

2. The apparatus of claim 1 wherein said signal receiver means includes means for determining said first satellite-specific relative range values as a function of first pseudo range values derived from said coded information on said satellite information signals, where each of said first pseudo range values corresponds to the range between said first antenna and one of said selected satellites at specific measurement times, and means for determining said second satellite-specific relative range values as a function of second pseudo range values derived from said coded information on said satellite information signals, where each of said second pseudo range values corresponds to the range between said second antenna and one of said selected satellites at said specific measurement times, and said range difference processor means determines said satellite-specific relative range difference values as a function of the difference between corresponding ones of said first and second pseudo range values derived from the same satellite information signal.

3. The apparatus of claim 1 wherein said signal receiver means includes means for determining each of said first and second satellite-specific relative range values as a function of signal characteristics of said carrier signal as received by said first and second antennae.

4. The apparatus of claim 3 wherein said signal receiver means includes means for determining said first satellite-specific relative range values as a function of first carrier phase values derived from said satellite information carrier signals, where each of said first carrier phase values corresponds to the range between said first antenna and one of said selected satellites at specific measurement times, and means for determining second satellite-specific relative range values as a function of second carrier phase values derived from said satellite information carrier signals, and said range difference processor determines said satellite-specific relative range difference values as a function of the difference between corresponding ones of said first and second carrier phase values derived from the same satellite information carrier signal.

5. The apparatus of claim 3 wherein each of said satellite-specific relative range difference values is derived from a frequency difference between carrier signals from the same satellite separately received by said first and second antennae.

6. The apparatus of claim 3 wherein said signal receiver means includes means for determining said first satellite-specific relative range values as a function of first Doppler count values derived from said satellite information carrier signals, where each of said first Doppler count values corresponds to the range between said first antenna and one of said selected satellites at specific measurement times, and means for determining second satellite-specific relative range values as a function of second Doppler count values derived from said satellite information carrier signals, where each of said second Doppler count values corresponds to the range between said second antenna and one of said selected satellites at specific measurement times, and said range difference processor determines said satellite-specific relative range difference values as a function of the difference between corresponding ones of said first and second Doppler count values derived from the same satellite information carrier signal.

7. The apparatus of claim 6 wherein said signal receiver means includes carrier signal processing means responsive to said received carrier signals associated with each of said satellite information signals, said carrier signal processing means including:

means for determining antenna-satellite-specific Doppler shift as concurrently observed by said first and second antennae for each one of said selected satellite signals;

means for determining a first and a second integrated Doppler shift count over a selected time interval for each of said first and second antennae, respectively; and said range difference processor means determines each of said satellite-specific relative range difference values as a function of the difference between said first and second integrated Doppler shift counts associated with the same satellite.

8. The apparatus of claim 4 wherein said each of said first and second satellite-specific relative range values is derived from said coded information associated with each of said carrier signals separately received by said first and second antennae.

9. The apparatus of claim 1 wherein said information processing means processes said information in accordance with a Kalman Filter.

10. The apparatus of claim 3 wherein said signal receiver means includes means for determining said first satellite-specific relative range values as a function of first pseudo range rate values derived from said satellite information carrier signals, where each of said first pseudo range rate values corresponds to the range between said first antenna and one of said selected satellites at specific measurement times, and means for determining said second satellite-specific relative range values as a function of second pseudo range rate values derived from said satellite information carrier signals, and said range difference processor means determines said satellite-specific relative range difference values as a function of the difference between corresponding ones of said first and second pseudo range rate values derived from the same satellite information carrier signal.

11. The apparatus of claim 1 wherein said signal receiver means consists of first and second GPS signal receiver systems, each separately coupled to said first and second antennae, respectively.

12. A method of determining true North directional heading information comprising the steps of:

receiving satellite information signals through first and second antennae rigidly fixed to a platform, separated by a known separation distance, and there being a line passing through the positions of said antennae having a known orientation relative to a platform coordinate reference frame, and in which said first and second antennae provides first and second electrical signals, respectively, in response to distinguishable satellite information signals transmitted from selected satellites, which form, in part, a satellite based global positioning system, and in which each satellite information signal is consists of a carrier signal containing coded information therewith;

deriving from said first and second electrical signals information representative of (i) an estimated geocentric position of said platform at specific measurement times, (ii) the geocentric position of said plurality of selected satellites at said specific measurement times, and (iii) satellite-specific relative range difference values, where each satellite-specific relative range difference value is related to the difference between (a) the range between said first antenna and a specific satellite transmitting the corresponding satellite information signal and (b) the range between the second antenna and the same satellite, at substantially said specific measurement times;

obtaining attitude information from an inertial sensor system related to first, second, and third angles of rotation corresponding to the platform pitch, roll, and heading angles, respectively, of said platform relative to an initially established orthogonal computational coordinate reference frame; and operating on said information representative of
(i) said estimated geocentric position of said platform,
(ii) said geocentric position of said selected satellites,
(iii) said satellite-specific relative range difference values,
(iv) said known antennae separation distance, and
(iv) said attitude information, for determining a heading offset angle, where said heading offset angle is the difference between said platform heading angle and substantially the true north heading angle of said platform whereby said true north heading angle is determined.

* * * * *

(12) EX PARTE REEXAMINATION CERTIFICATE (9091st)
United States Patent
Ignagni

(10) Number: US 5,617,317 C1
(45) Certificate Issued: Jun. 26, 2012

(54) TRUE NORTH HEADING ESTIMATOR UTILIZING GPS OUTPUT INFORMATION AND INERTIAL SENSOR SYSTEM OUTPUT INFORMATION

(75) Inventor: Mario B. Ignagni, Arden Hills, MN (US)

(73) Assignee: Honeywell, Inc., Minneapolis, MN (US)

Reexamination Request:
No. 90/011,050, Jun. 15, 2010

Reexamination Certificate for:
Patent No.: 5,617,317
Issued: Apr. 1, 1997
Appl. No.: 08/378,114
Filed: Jan. 24, 1995

(51) Int. Cl.
*G01S 5/02* (2006.01)

(52) U.S. Cl. .................................. 701/215; 342/357.31
(58) Field of Classification Search ....................... None
See application file for complete search history.

(56) References Cited

To view the complete listing of prior art documents cited during the proceeding for Reexamination Control Number 90/011,050, please refer to the USPTO's public Patent Application Information Retrieval (PAIR) system under the Display References tab.

*Primary Examiner* — Karin M. Reichle

(57) ABSTRACT

Inertial sensor information is combined with GPS information derived from satellite information signals separately received by a pair of GPS antennae and separately processed. This information is processed in a manner to arrive at the offset angle between the inertial sensor heading angle and true north.

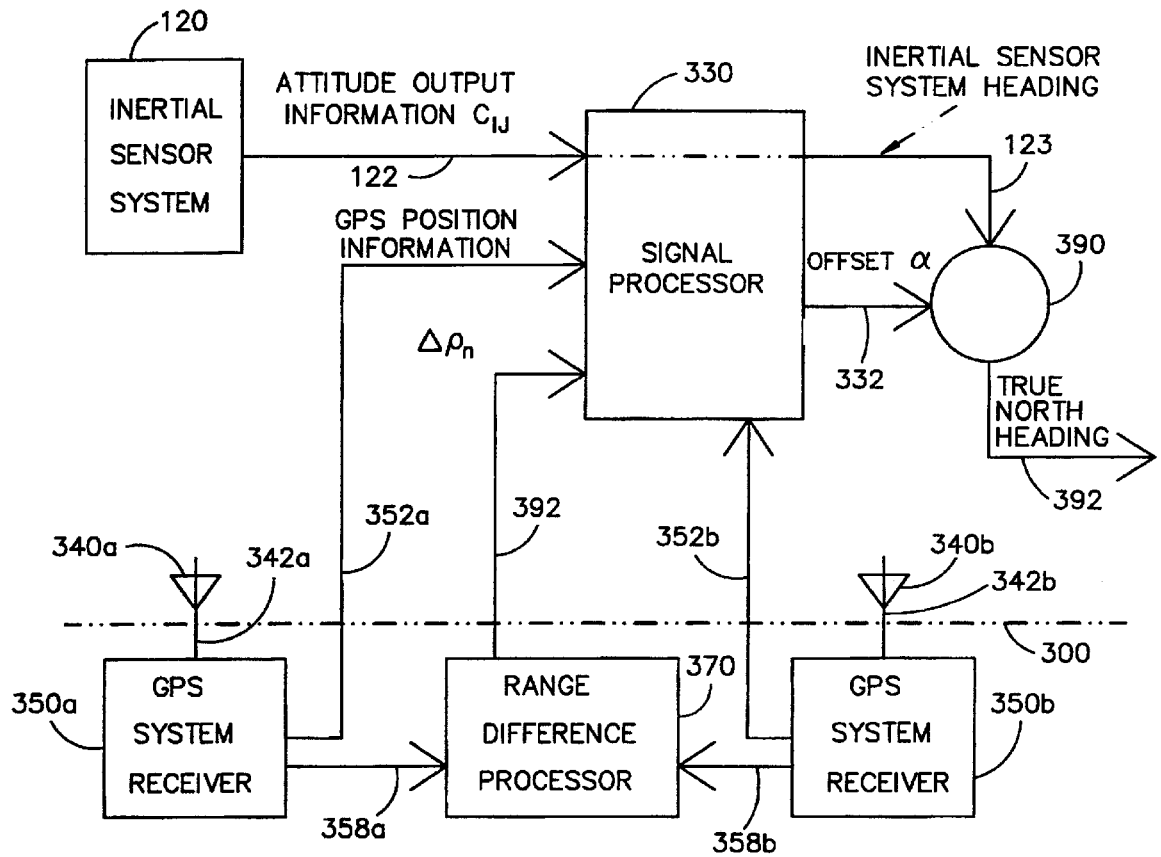

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-12 is confirmed.

* * * * *